June 3, 1952
R. L. BARRY ET AL
2,598,668
MEANS FOR THE ELECTRICAL MEASUREMENT AND
RECORDING OF ACCELERATION, VELOCITY, AND
DISPLACEMENTS OF MOVING BODIES
Original Filed Dec. 15, 1945
2 SHEETS—SHEET 2
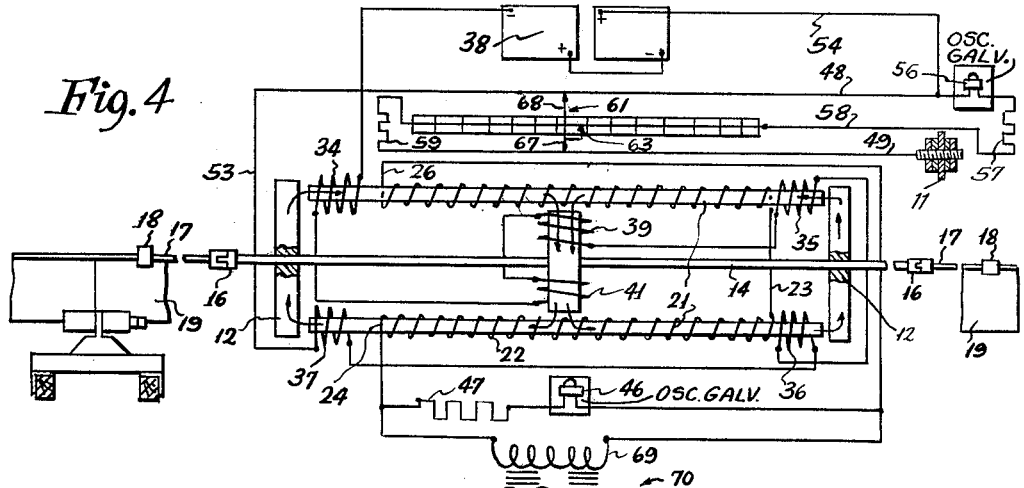
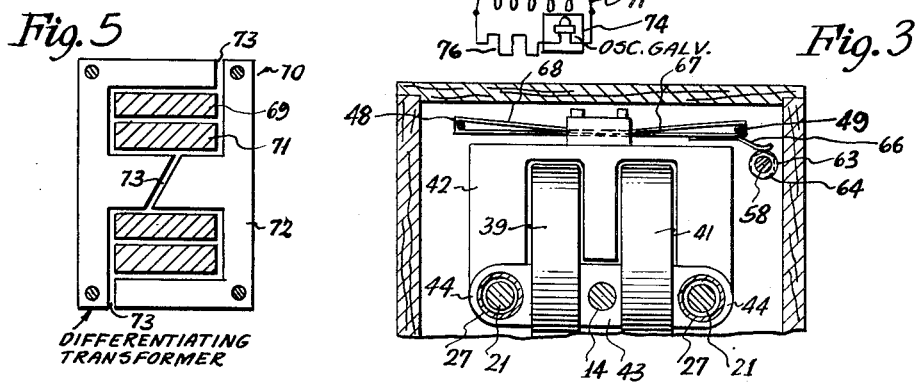
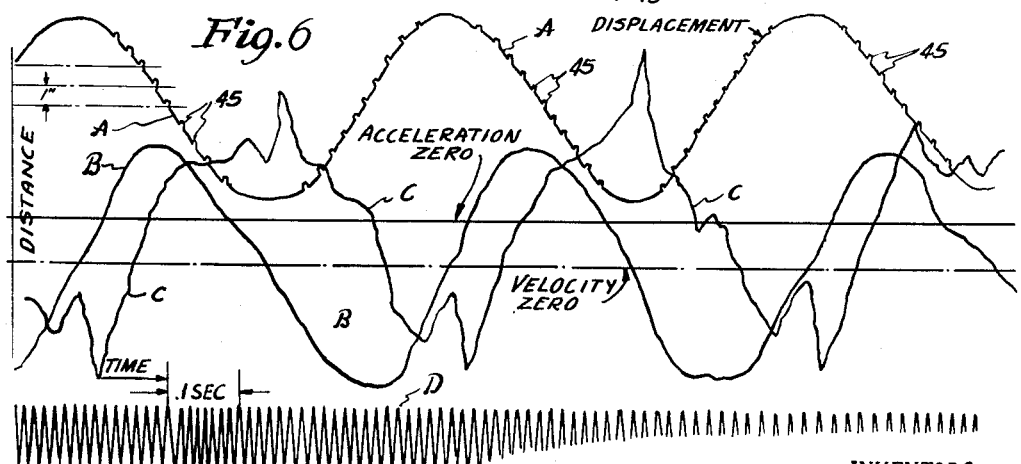
INVENTORS
Robert L. Barry
Chester C. Boesewetter
BY
Clarence F. Poole
ATTORNEY Patented June 3, 1952

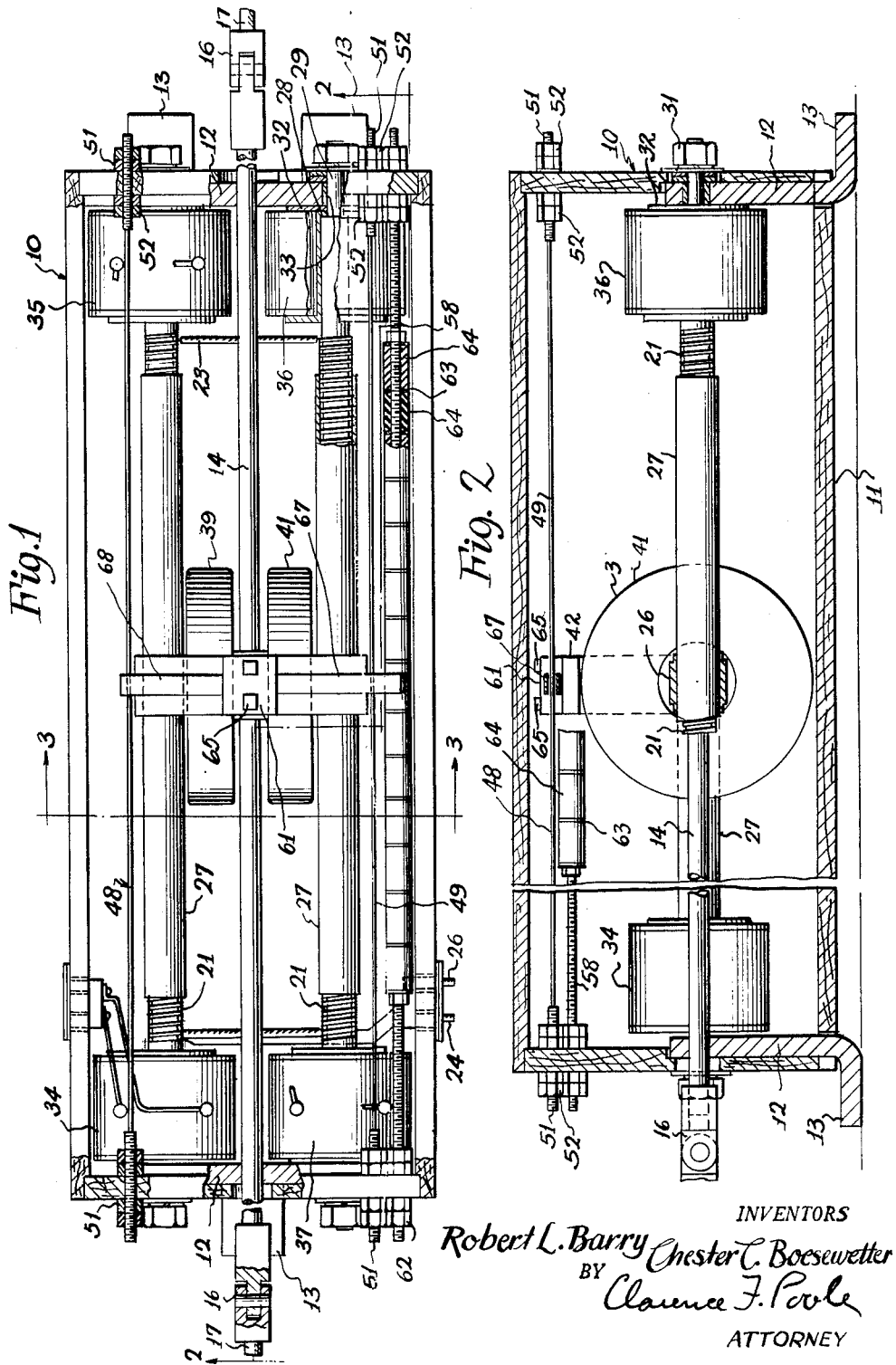

2,598,668

UNITED STATES PATENT OFFICE 2,598,668

MEANS FOR THE ELECTRICAL MEASUREMENT AND RECORDING OF ACCELERATION, VELOCITY, AND DISPLACEMENTS OF MOVING BODIES

Robert L. Barry and Chester C. Boesewetter, Downers Grove, Ill., assignors to Goodman Manufacturing Company, Chicago, Ill., a corporation of Illinois Continuation of application Serial No. 635,370, December 15, 1945. This application January 14, 1949, Serial No. 70,942

28 Claims. (Cl. 346—33)

This invention relates to improvements in devices for measuring the kinematic properties of a moving body and is particularly directed to improvements in devices for the electrical measurement and recording of acceleration, velocity and displacement of moving bodies, such as shaker conveyors, oil well drills, piston rods, and various other types of devices having reciprocating motions, for the purpose of analyzing and studying such motions.

This application is a continuation of our application Serial No. 635,370, entitled "Means for the Electrical Measurement and Recording of Acceleration, Velocity and Displacements of Moving Bodies," filed December 15, 1945, now abandoned.

Heretofore the velocity of rectilinearly moving bodies has been studied by first converting their motion into a voltage which was a function of such movement. The study of such motion has heretofore required the translating of the rectilinear motion of the body into angular motion by means of gearing and by driving an electric generator from such gearing. The voltage derived in such a generator is then substantially proportional to the velocity of the moving body and is adapted to be measured and recorded by a galvanometer type oscillograph to provide a curve representing the velocity of the moving body. In order to provide a rippleless curve in the voltage so generated, it is necessary to have a voltage generator of very high quality with very low commutator and slot ripple or to have a filter circuit associated with the generator to reduce the ripple in such curves. Filters, however, introduce a time lag into the record, which varies with the frequency and distorts the curve with relation to other curves which may be recorded at the same time. Such filters are not successful when the angular velocity is changing rapidly because the filtering effect changes with the change in the angular velocity.

One of the principal objects of this invention is to enable the kinematic properties of a moving body to be analyzed and studied.

A second object is to provide a new and improved device for analyzing the displacement, velocity and acceleration of a moving body.

Yet another object is to derive a number of rippleless voltages which are a direct function of the kinematic properties of a moving body and to record the rippleless voltages so derived in a galvanometer type recording oscillograph or any other device for recording continuously varying voltages.

Still another object comprehends the provision of a generator for deriving voltages which are a function of the kinematic properties of a moving body, so constructed and arranged as to generate a number of rippleless voltages which may be recorded by any convenient means.

Yet another object comprehends the generation of a rippleless voltage which is a function of the velocity at any instant of a moving body, the voltage so derived being then differentiated with respect to time to provide an additional voltage which will be a function of the acceleration of the moving body, both of said voltages being adapted to be recorded to study the velocity and acceleration characteristics of the moving body.

Still another object is to study the kinematic properties of a moving body and to record voltages derived as a function of the movement of said body, the voltage curve representing the displacement of the body at any instant being characterized by "pips" or nodes therein which are accurately and evenly spaced so as to give an indication of the exact position of the moving body at any instant.

The foregoing and other objects of this invention will appear from a study of the specification following, taken together with the accompanying drawings wherein:

Figure 1 is a plan view of a voltage generator constructed in accordance with the present invention;

Figure 2 is a longitudinal sectional view taken substantially along the line 2—2 of Figure 1;

Figure 3 is a fragmentary transverse sectional view taken substantially along the line 3—3 of Figure 1;

Figure 4 is a diagrammatic view showing a wiring diagram according to the present invention for determining the kinematic properties of a moving body;

Figure 5 is a longitudinal section taken through a differentiating transformer employed in the circuit shown in Figure 4, and adapted to deliver an output voltage substantially proportional to the time derivative of the input voltage; and Figure 6 is a graph showing the velocity, acceleration and displacement curve of a reciprocating body recorded by a device constructed in accordance with the present invention.

Referring now particularly to Figures 1 to 3 of the drawings, the apparatus for determining the kinematic properties of a moving body is indicated generally at 10, and includes a wooden casing 11 supported at each end by an L-shaped standard or yoke 12 resting upon feet 13, 13. The standards 12, 12 provide journal support for a rod 14 provided at each end with an articulated joint 16 to which is connected a flexible cable 17. Referring to Figure 4, the remote ends of the flexible cable 17 are connected at 18 to a trough pan line 19, of a shaker conveyor such as may be used in mines for removing minerals from the working faces to the portal, see Figure 4. It should be understood, however, that the rod 14 may be secured in any other fashion to the trough pan line 19 and may be likewise secured to any other moving body of which it is desired to ascertain the kinematic properties.

Means are provided for deriving a voltage which is a function of the velocity at any instant of the moving body, which in this instance is the shaker trough pan line 19. To this end there is provided a pair of parallel bars 21 which are spaced equal distances on each side of the rod 14, and which are preferably provided with square threads, to furnish continuous slots for an armature coil 22 wound therein, see also Figure 4. The armature coils 22 are connected in series by a conductor 23, and each end of the coil terminates in conductors 24 and 26, shown also schematically in Figure 4. The coils 22 wound on the threaded bars 21 may be considered analogous to the armature coils wound on the armature of a rotating generator, so for convenience will be referred to herein as armature coils.

Each of the coils 22 is encircled by a sleeve 27 formed from any suitable insulating material. The bars 21 are supported at each end of the vertical standards 12, and are provided at each end with a shoulder 28 and a reduced portion 29 which is threaded to receive a nut 31, see particularly Figures 1 and 2. The magnetic flux developed in each of the bars 21 is prevented from leaking into the standards 12 by means of a brass washer 32 abutting the shoulder 28 and a brass bushing 33 encircling the reduced portion 29.

Means are provided for deriving a voltage in the armature coils 22 which is a function of the velocity of the moving body (a shaker trough pan) at any instant thereof. To this end there are provided field coils 34, 35, 36 and 37, each of which is mounted at an end of the bars 21, and which are adapted to be supplied with energy from a direct current source 38, to set up a magnetic flux in the bars 21, 21. The washers 32 which bear against the shoulders 28 on the bars 21 also bear against the outer faces of the field coils 34, 35, 36 and 37, and serve to insulate the field flux developed therein from the yoke or support 12. Additionally, the nuts 31 which hold the bars 21 in position bear against the casing 11 which is formed of non-conducting material, such as wood, which is used to magnetically insulate the nuts and bars from the yoke or standard 12.

The field coils 34, 35, 36 and 37 are connected in series, as shown in Figure 4, and are additionally connected in series with moving field coils 39 and 41, and which are held within a frame 42 and are supported on a core 43 secured to the rod 14 in any convenient fashion. It will be seen with reference to Figure 3 that the core 43 is provided with a circular aperture 44 at each end thereof which encircles the sleeve 27. While the moving field coils 39 and 41 have been shown as of the electro-magnetic type connected in series with the stationary field coils 34, 35, 36 and 37, it may readily be understood that the sliding field coils 39 and 41 may be substituted by a permanent magnet of any well known type.

The coils 34 and 35 on one of the rods 21 are arranged to have like poles facing each other, while coils 36 and 37 on the other of the rods 21 are arranged to have like poles facing each other but of the opposite sense from the facing poles 34 and 35. That is to say, coils 34 and 35 may be arranged to have their north poles facing each other and coils 36 and 37 would be then arranged to have their south poles facing each other. The coils 39 and 41 which provide the moving field for the armature coils 22, 22 are so arranged that their polarity complements the polarity of the stationary field coils 34, 35, 36 and 37. That is to say, the pole of coil 39 adjacent the rod 21 is a south pole, while the pole of coil 41 adjacent the rod 21 supporting stationary field coils 36 and 37 is a north pole. It will be apparent that the arrangement thus far described provides for two closed magnetic paths as seen in Figure 4.

As the moving field coils 39 and 41 move on the rod 14 with respect to the armature coils 22, a voltage will be developed across the conductors 24 and 26 which will vary in accordance with the velocity of the shaker trough pans 19. Obviously, when the moving field coils 39 and 41 are stationary for an instant, when the direction of reciprocation of the moving trough pans 19 changes, no voltage will be developed across the conductors 24 and 26, and obviously, also, when the velocity of the moving field coils 39 and 41 is greatest with respect to the armature coils 22, the voltage developed across the conductors 24 and 26 will be at the maximum value. It is obvious also that in between these two extremes of maximum voltage and no voltage, that the voltage so developed will be at an intermediate value which is a function of the velocity of the trough pans 19. As shown in Figure 4, a recording galvanometer type oscillograph 46 is connected across the conductors 24 and 26 in series with a resistor 47. The oscillograph 46 will record the variations in voltage across the conductors 24 and 26, as a function of the velocity of the shaker trough pans 19. As shown in Figure 6, curve B is a trace of the voltage recorded by the oscillograph 46.

It will be apparent that the voltage so derived by the movement of the shaker trough pans 19 will be completely free from ripple since the generation is characterized by the absence of any commutation in developing the voltage, and will give a voltage which varies in accordance with the velocity of the shaker trough pan 19.

Means are provided for deriving a voltage which is a function of the displacement of the moving body (the shaker trough pan line 19), and which is recorded on a recording oscillograph. The voltage curve from the voltage so derived is characterized by small pips or nodes 45 on a displacement curve A, see Figure 6, which will give an accurate indication of the exact position of the moving body in its reciprocating movement. To this end there is provided a pair of elongated resistance slide wire elements 48 and 49 which are enlarged at their ends and threaded as at 51 and secured to the casing 11 by means of lock nuts 52. As shown in Figure 4, the slide wire 48 is connected in series with the field coils 34, 35, 36 and 37 by means of a conductor 53 and a conductor 54 to the source of power 38. A parallel circuit is provided with the slide wire 48 which includes a recording type oscillograph 56, a calibrating resistor 57, a conductor 58, a fixed resistor 59, and a portion of the slide wire 49, the parallel circuit being completed back to the slide wire 48 by means of a slider 61. As shown in Figures 1 and 3, the calibrating bar 58 is secured at its ends to the casing 11 by means of nuts 62 threaded thereto at each end. The calibrating bar 58 is provided with a plurality of uniformly spaced conducting disks 63, which are separated by insulating sleeves 64. A slider 61 is secured to the frame 42 in any convenient fashion, as by cap bolts 65, and includes arms 67 and 68 which contact the slide wires 48 and 49 respectively, the arm 67 being provided with a spring rider 66 adapted to contact the conducting disks 63 and insulating sleeves 64 in its movement with the rod 14.

It will be seen that as the slider 61 moves with the frame 42 to the left as seen in Figure 4, the voltage impressed across the oscillograph 56 will increase in accordance with such movement. As the slider 61 moves to the left, it will be seen that the parallel circuit, one branch of which contains the portion of the slide wire 48 between its juncture with the conductor 54 and the slider 61 and the other branch of which includes the oscillograph 56, the calibrating resistor 57, the calibrating bar 58, the fixed resistor 59 and a portion of the slide wire 49, will vary in its resistance as determined by the position of the slider 61. Thus, if the amount of resistance in the parallel circuit caused by the portion of the slide wire 48 between its point of juncture with the conductor 54 and the slider 61 increases by the movement of the slider 61 to the left, the amount of movement of the oscillograph 56 will be in proportion to such change in resistance, thus providing an accurate record of the fluctuation in voltage occasioned by such change in resistance resulting from the movement of the slider 61 and the shaker trough pan 19. As has been explained, the movement of the slider 61 past the conducting disks 63 will cause a momentary decrease in resistance of the circuit containing the ocsillograph 56, thus at such points in movement of the slider 61 causing small pips or nodes 45 to appear on the curve so traced. It will be apparent that the vertical distance between the pips or nodes 45, see Figure 6 is proportional to the distance between the conductor disk 63, see Figures 1 and 2, and will enable the user of the graph or curve traced by the oscillograph 56 to determine the total movement of the shaker trough pan 19.

Means are provided for differentiating the voltage which is a function of the velocity of the moving body at any instant with respect to time, and recording the differentiated voltage on a recording type oscillograph. As shown with particular reference to Figures 4 and 5 of the drawings, the voltage derived across the conductors 24 and 26 is fed to a primary winding 69 of a differentiating transformer 70. The differentiating transformer 70 is so designed and constructed that the voltage derived across a secondary winding 71 thereof will be proportional to the derivative with respect to time of the input voltage. This is accomplished by designing the differentiating transformer so that it has a very large ratio of magnetizing current to secondary current, with a primary resistance or IR drop of at least twenty times the voltage induced by the flux in the primary, and by maintaining a high coefficient of coupling and low eddy current and low hysteresis loss. The differentiator angle of the input voltage with respect to the output voltage is approximately proportional to the frequencies of the moving body (assuming sine wave motion study) and when converted to time angle displacement on the oscillograph will result in a constant time lag over the range of frequencies experienced. The differentiating transformer 70 has its primary coil 69 and its secondary coil 71 wound on a core consisting of oppositely faced substantially F-shaped core lamination segments 72 spaced apart at their faces as at 73 to provide a long air gap therebetween, see Figure 5. The core laminations 72 are preferably made of a steel of a high nickel content. The long air gaps 73 provide a large magnetizing current and a small secondary voltage as mentioned above and bring the output voltage of the transformer to essentially the mathematical differentiated value with respect to the input voltage, so that the differentiated voltage wave traced on an oscillograph will have a deflection directly proportional to the current flowing through it, which when recorded will give an accurate acceleration curve of the moving body or the shaker trough pan line 19.

Means are provided for measuring the output voltage across the secondary of the differentiating transformer 70, and as shown in Figure 4 consists of a galvanometer type of oscillograph 74 which is connected in series with a resistance 76 to control the amplitude of deflection of the galvanometer. An acceleration curve of a moving body recorded by the oscillograph 74 is indicated by reference character C in Figure 6.

The oscillographs 46, 56 and 74 are a part of a multiple element type of oscillograph which will record the traces of voltage described above on a travelling photographic film or other moving strip, which will also have a time trace D thereon which is made simultaneously with the traces A, B, and C so that they may be correlated with each other and with respect to time. The details of such a recording oscillograph are no part of the invention.

It should here be noted that since the differentiation is achieved by a differentiating transformer, no frequency resonancy is introduced, and that the system of our invention does not have a natural mode of vibration and therefore is not able to pick up extraneous vibrations which ordinarily interfere with the correct interpretation of accelerometer records, and only picks up those rectilinear motions studied, and then only to the extent of their actual values, since there must be an actual motion before the generator can generate a voltage and the differentiator can determine the time rate of voltage change. The presence of vibrations in some types of instruments makes the interpretation of acceleration records virtualy impossible, and the necessity of a dampening means to dampen extraneous vibrations, with the resultant introduction of a time lag in the recorded curve, is therefore obviated; according to the present invention, then, a new and novel means has been provided for accurately recording acceleration curves of moving bodies.

It should be noted, however, that other means for differentiating the voltage derived in the armature coils 22 may be employed. Vacuum tube circuits such as disclosed in Norton Patent No. 2,324,797, issued July 20, 1943, for a Differentiating Amplifier, is a known method and means for differentiating such a voltage.

While the preferred embodiment of the invention has been described it is to be understood that the construction thereof and the arrangement of the various parts may be altered without departing from the spirit and scope thereof.

Furthermore, the invention is not intended to be limited to the specific embodiment illustrated excepting as it may be limited in the claims appended hereto.

We claim:

1. Apparatus of the class described for determining the kinematic properties of a moving body comprising a voltage generator for deriving a voltage which is a function of the velocity of said moving body, said voltage generator comprising a field and an armature movable in a rectilinear path relative to each other, means for deriving a further voltage which is a function of the rate of change of the first said voltage with respect to time, said further voltage being a function of the acceleration of said moving body, and means for measuring and recording both of said voltages so derived as indicia of the kinematic properties of said moving body.

2. Apparatus of the class described for determining the kinematic properties of a moving body comprising means for deriving a voltage which is a function of the displacement of said moving body, a voltage generator for deriving a second voltage which is a function of the velocity of said moving body, said voltage generator comprising a field and an armature movable in a rectilinear path relative to each other, means for deriving a further voltage which is a function of the rate of change of the said second voltage with respect to time, said further voltage being a function of the acceleration of said moving body, and means for measuring and recording all of the voltages so derived as indicia of the kinematic properties of said moving body.

3. Apparatus of the class described for determining the acceleration characteristics of a moving body comprising a generator having a stationary armature and a reciprocating field, an operative connection from said moving body to said field to reciprocably move said field and induce a voltage in said armature, means for differentiating the voltage induced in said armature with respect to time, and means for recording the trace of said differentiated voltage.

4. Apparatus of the class described for determining the acceleration characteristics of a moving body comprising a generator having a stationary armature and a reciprocating field, an operative connection from said moving body to said field for developing a voltage in said stationary armature which is a function of the movement of said moving body, means for differentiating the voltage so developed with respect to time, and a recording oscillograph for recording the trace of the differentiated voltage.

5. Apparatus for determining the acceleration characteristics of a moving body comprising a generator having a stationary armature and a reciprocably movable field, a connection from said moving body to said field for reciprocably moving said field with respect to said armature to develop a voltage in said armature which is a function of the movement of said moving body, a transformer having a primary winding adapted to have the voltage so developed impressed thereacross, said transformer being so constructed as to develop a voltage which is the derivative with respect to time of said first voltage, and an oscillograph for indicating and recording the trace of said differentiated voltage as an index of the acceleration of said moving body.

6. In apparatus for determining the acceleration characteristics of a moving body, a voltage generator comprising a field and an armature movable in a path relative to each other, a connection from said moving body to said generator whereby said generator will derive a voltage which is a function of the velocity of said body, means for differentiating the voltage so derived with respect to time, and means for recording the differentiated voltage as an index of the acceleration characteristics of said moving body.

7. In apparatus for determining the acceleration characteristics of a moving body, a reciprocable generator having a connection with said moving body and including a stationary armature and a reciprocating field for deriving a voltage in said stationary armature which is a function of the movement of said moving body, a transformer connected to receive the output voltage of said armature and having a large magnetizing current compared with its secondary current, to deliver an output voltage which is the derivative with respect to time of the input voltage, and means for recording the output voltage as an index of the acceleration characteristics of said moving body.

8. In apparatus for determining the kinematic properties of a moving body, a pair of elongated resistance elements disposed in substantially parallel relationship, a source of power connected in circuit across said resistance elements, a recording oscillograph connected in series with one of said resistance elements, a reciprocably movable conductor engaging each of said elongated resistance elements and reciprocably driven by said moving body to pick off a voltage proportional to the displacement of said moving body, said recording oscillograph being adapted to measure the change in voltage as said conductor moves along one of said elongated resistance elements to measure the displacement of said moving body, said second elongated resistance element automatically adjusting the resistance in the oscillograph circuit as said conductor moves along said elongated resistance elements whereby the movement of said oscillograph response is a direct function of the linear displacement of said moving body.

9. In apparatus for determining the kinematic properties of a moving body, a pair of elongated resistance elements disposed in substantially parallel relationship, a source of power connected in circuit across said resistance elements, a recording oscillograph connected in series with one of said resistance elements, a reciprocably movable conductor engaging each of said elongated resistance elements and reciprocably driven by said moving body to pick off a voltage proportional to the displacement of said moving body, said recording oscillograph being adapted to measure the change in voltage as said conductor moves along one of said elongated resistance elements to measure the displacement of said moving body, said second elongated resistance element automatically adjusting the resistance in the oscillograph circuit as said conductor moves along said elongated resistance elements so that the portion of the other of said elongated resistance elements in the circuit at any instant plus the portion of the first mentioned elongated resistance element in the circuit at the same instant will be a constant in all positions of said conductor along said elongated resistance elements whereby the movement of said oscillograph is in response to the linear displacement of said moving body.

10. In apparatus for determining the kinematic properties of a moving body, a reciprocating generator having a stationary armature and a reciprocating field, a connection from said moving body to said field to reciprocably move said field, means connected across said armature to measure and record the voltage induced in said armature by movement of said field as a function of the velocity of said moving body at any instant of time, means for differentiating the voltage so induced with respect to time, and means for measuring and recording the differentiated voltage as a function of the acceleration of said moving body.

11. In apparatus for determining the kinematic properties of a moving body, a reciprocating generator having a stationary armature and a reciprocating field, a connection from said moving body to said field to reciprocably move said field and to derive a voltage in said armature which is a function of the velocity at any instant of said moving body, means connected across said armature to measure and record the voltage so derived, and a differentiating transformer for delivering an output voltage which is substantially proportional to the time derivative of the voltage derived in said armature, and means for measuring and recording the differentiated voltage as a function of the acceleration of said moving body.

12. In apparatus for determining the kinematic properties of a reciprocating body, a voltage generator adapted to provide a rippleless voltage which is a function of the velocity of said reciprocating body, said generator having a stationary armature and a reciprocably movable field connected to said reciprocating body, means connected across said armature to measure and record the voltage generated by movement of said field with respect to the armature as a function of the velocity of said reciprocating body, and means for differentiating the voltage induced in said armature with respect to time including a differentiating transformer connected to receive the voltage induced in said armature, and means for recording the differentiated voltage as a function of the acceleration characteristics of said moving body.

13. A means for the electrical measurement and recording of acceleration of a moving body including a reciprocable generator having a stationary armature and a reciprocably movable field, an operative connection from said moving body to said field to reciprocably move said field, a differentiator connected across said armature to receive the output voltage of said armature and to deliver an output voltage substantially linearly proportional to the time derivative of the input voltage, and a galvanometer connected across said differentiator for indicating the trace of the output voltage delivered by said differentiator.

14. A means for the electrical measurement and recording of acceleration of a moving body including a reciprocable generator having a stationary armature and a reciprocably movable field, an operative connection from said moving body to said field, to reciprocably move said field, a differentiator connected across said armature for delivering an output voltage substantially linearly proportional to the time derivative of the input voltage, and means connected across said differentiator to record the trace of the output voltage of said differentiator and provide the acceleration curve of the moving body.

15. A means for the electrical measurement of acceleration of a moving body including a reciprocable generator having a stationary armature and a reciprocably movable field, an operative connection from said moving body to said field to reciprocably move said field, a transformer connected to receive the output voltage of said armature and having a large magnetizing current compared with its secondary current, to deliver an output voltage substantially linearly proportional to the time derivative of the input voltage, and an oscillograph for indicating and recording the trace of the output voltage of said transformer and providing the acceleration curve of the moving body.

16. A means for the electrical measurement and recording of displacement of a reciprocating body including a slide wire forming a resistance element, means for connecting said wire with a source of power, a voltage measuring device connected with said slide wire, a second slide wire extending parallel to said first mentioned slide wire and forming a resistance element having the same total resistance value as said first mentioned slide wire, and connected in series with said voltage measuring device and said first mentioned slide wire, a reciprocably movable conductor engaging each of said wires and reciprocably driven by the reciprocating body, to pick off a voltage linearily proportional to the displacement of the moving body, said voltage measuring device serving to measure the change in voltage as said conductor moves along said wires as a measure of the displacement of said reciprocating body, and said first slide wire automatically adjusting the resistance in the voltage measuring device circuit as said conductor moves along said wires so the portion of said second mentioned slide wire in the circuit at any instant plus the portion of said first mentioned slide wire in the circuit the same instant, will be a constant in all positions of said conductor along said wires whereby said voltage measuring device responds accurately to linear displacement of said moving body.

17. A means for the electrical measurement of velocity and acceleration of a moving body including a reciprocating generator having a stationary armature and a reciprocably movable field, an operative connection from the moving body to said field to reciprocably move said field, means connected across said armature to measure and record the voltage generated by said generator as a function of the velocity of said moving body, a diffentiator for delivering an output voltage substantially proportional to the time derivative of the voltage so generated, and means for measuring and recording the output voltage of said differentiator as a function of the acceleration of said moving body.

18. A means for the electrical measurement of velocity and acceleration of a moving body including a reciprocating generator having a stationary armature and a reciprocably movable field, an operative connection from the moving body to said field to reciprocably move said field, means connected across said armature to measure and record the voltage generated by said generator and the velocity of said moving body, and a differentiator for delivering an output voltage substantially proportional to the time derivative of the first voltage so generated including a transformer the primary of which is connected across said field, and means connected across the secondary of said transformer to measure and record the output voltage of said transformer and the acceleration curve of said moving body.

19. A means for measuring velocity and acceleration of a reciprocating body including a reciprocating generator adapted to provide a rippleless voltage directly proportional to the velocity of the reciprocating body and having a stationary armature and a reciprocably movable field, an operative connection from the reciprocating body to said field to reciprocably move said field, means connected across said armature to measure and record the voltage generated by said generator and the velocity of said reciprocating body, and a differentiator for delivering an output voltage substantially proportional to the time derivative of the input voltage generated, including a transformer connected to receive the output voltage of said armature, said transformer having a relatively long air gap to provide a large magnetizing current compared with its secondary current, and means for recording the output voltage of said transformer and the acceleration curve of said moving body.

20. A means for measuring velocity and acceleration of a reciprocating body including a rectilinear voltage generator adapted to provide a rippleless voltage directly proportional to the velocity of the reciprocating body and having two elongated stationary armature coils wound with a constant lead and a field movable along said coils to induce a rippleless voltage in said coils, an operative connection from the reciprocating body to said field to reciprocably move said field, an oscillograph connected across said armature coils for measuring and recording the output voltage of said armature coils and as a function of the velocity of said reciprocating body, a differentiator for delivering an output voltage substantially linearly proportional to the time derivative of the output voltage from said armature coils, and an oscillograph for measuring and recording the voltage so differentiated by said differentiator and recording the acceleration curve of said reciprocating body.

21. A device for measuring velocity, acceleration and displacement of a reciprocating body including a rectilinear generator having two elongated stationary armature coils having a constant lead and a field movable along said coils to induce a rippleless voltage in said coils directly proportional to the velocity of the reciprocating body, a source of electric power to excite said field, an operative connection from said reciprocating body to said field to reciprocably move said field, means connected across said armature coils for measuring and recording the output voltage of said generator and the velocity of said reciprocating body, a differentiator connected to receive the output voltage of said generator and deliver voltage which is substantially linearly proportional to the time derivative of the output voltage from said generator, means for recording the trace of the voltage so differentiated, a slide wire extending along said coils and connected with said source of power, a slide connected with said field and forming a slidable conductor engaging said slide wire to complete a circuit therethrough, and means for measuring and tracing the change in voltage at the point where said slide engages said wire as said field and slide move therealong, to measure the displacement of said reciprocating body.

22. A device for measuring velocity, acceleration and displacement of a reciprocating body including a rectilinear generator having two elongated stationary armature coils having a constant lead and a field movable along said coils to induce a rippleless voltage in said coils directly proportional to the velocity of the reciprocating body, a source of electric power to excite said field, an operative connection from said reciprocating body to said field to reciprocably move said field, means connected across said armature coils for measuring and recording the output voltage of said generator and the velocity of said reciprocating body, a differentiator connected to receive the output voltage of said generator and deliver an output voltage substantially linearly proportional to the time derivative of the input voltage, means for recording the trace of the voltage so differentiated by said differentiator, a pair of slide wires extending along said coils and connected with said source of power, a slide connected with said field and forming a slidable conductor engaging both of said slide wires to complete a circuit therethrough, and means for measuring and tracing the change in voltage at the point where said slide engages said wires as said field and slide move therealong, to measure the displacement of said reciprocating body, and a calibrating bar having a central conductor connected in series with said wires and having a plurality of uniformly spaced conductors connected with said central conductor and adapted to be engaged by said slide, insulating means separating said spaced conductors to cause a momentary decrease in resistance as said slide engages said spaced conductors and provide humps in the displacement curve traced by said measuring and tracing means, to accurately determine the exact part of the stroke of the reciprocating body where the changes in velocity, acceleration and displacement thereof occur.

23. In a reciprocating electrical generator adapted to provide a rippleless voltage proportional to velocity to provide a means for accurately determining the velocity and acceleration of a reciprocating body, a yoke having two parallel spaced side members and two parallel spaced end members and having coils of a uniform lead wound around and extending along said side members and forming the armature of said generator, a slide mounted for movement along said coils, means for causing a magnetic flux to flow through said end members and along opposite side members of said yoke in opposite directions to and through said slide, and means for reciprocably moving said slide along said yoke to cause a change in flux at the place where said slide passes along said armature coils and to induce a rippleless voltage in said coils proportional to the velocity of said slide.

24. In a reciprocating electrical generator adapted to provide a rippleless voltage proportional to velocity to provide a means for accurately determining the velocity and acceleration of a reciprocating body, a yoke having two parallel spaced side members and two parallel spaced end members and having coils of a uniform lead wound around and extending along said side members and forming the armature of said generator, a slide mounted for movement along said coils, means for causing a magnetic flux to flow through said end members and along opposite side members of said yoke in opposite directions to and through said slide, and means for reciprocably moving said slide along said yoke to cause a change in flux at the place where said slide passes along said armature coils and induce a rippleless voltage in said coils proportional to the velocity of said slide; and means providing air gaps between opposite ends of said side members and said end members to cause the flux to be substantially constant for all positions of said slide along said armature.

25. A reciprocating electrical generator adapted to provide a rippleless voltage proportional to velocity, to provide a means for accurately determining the velocity and acceleration of a reciprocating body including a yoke having two parallel spaced side members and two parallel spaced end members and having coils with a uniform lead wound around and extending along said side members and forming a stationary armature, opposed field coils adjacent each end of each of said side members and so arranged that the coil on the same ends of said side members will be of opposite polarity, a slide mounted for movement along opposite sides of said yoke and having a field coil wound thereon, means for exciting said field coils, and means for reciprocably moving said slide along said stationary armature to cause the armature coils to be cut by the lines of flux passing from opposite ends of said yoke through said slide and to induce a rippleless voltage in said armature coils which is directly proportional to velocity.

26. In a reciprocating electrical generator adapted to provide a rippleless voltage proportional to velocity, to provide a means for accurately determining the velocity and acceleration of rectilinearly moving bodies, a rectangular yoke having armature coils with a uniform lead wound along opposite sides thereof and having opposed field coils on each end of the sides of said yoke, opposite field coils on the same ends of said yoke being of opposite polarity, a magnetic slide mounted for movement along opposite sides of said yoke, means for reciprocably moving said slide along said yoke to cause said armature coils to be cut by the lines of flux passing from opposite ends of said yoke through said slide and induce a rippleless voltage in said armature coils proportional to the velocity of movement of said slide, and means providing an air gap between opposite sides of said yoke and the ends thereof to provide a substantially constant flux for all positions of said slide along said armature coils.

27. A reciprocating electrical generator adapted to put out a rippleless voltage proportional to velocity, to provide a means for accurately determining the velocity and acceleration of a reciprocating body including a yoke having two end members and two parallel spaced bars extending between said end members and threaded with a uniform lead, armature coils wound in the threads of said bars, opposed field coils on opposite ends of said bars, the field coils on adjacent ends of said bars being of opposed polarity, and a slide mounted for movement along said bars and having two field coils wound thereon, all of said field coils being connected together in series, and means for reciprocably moving said slide along said bars to cause said armature coils to be cut by the lines of flux passing from opposite ends of said yoke along said bars and produce a rippleless voltage in said armature coils proportional to the velocity of movement of said slide.

28. A reciprocating electrical generator adapted to put out a rippleless voltage proportional to velocity, to provide a means to accurately determine the velocity and acceleration of a reciprocating body including a yoke having two end members and two parallel spaced bars extending between said end members, said bars being threaded with a uniform lead and having the coils of an armature laid in the threads thereof, opposed field coils on opposite ends of said bars, the field coils on adjacent ends of said bars being of opposed polarity, a slide mounted for movement along said bars and having two field coils wound thereon, all of said field coils being connected together in series, means for exciting said field coils, means magnetically insulating said end members from said bars and providing an air gap between said end members and said bars to provide a substantially constant flux for all positions of said slide along said armature coils, and means for reciprocably moving said slide along said bars to cause said armature coils to be cut by the lines of flux passing from opposite ends of said yoke along said bars towards said slide, to induce a rippleless voltage in said armature coils proportional to the velocity of said slide.

ROBERT L. BARRY.
CHESTER C. BOESEWETTER.

REFERENCES CITED

The following references are of record in the file of this patent:

UNITED STATES PATENTS

| Number | Name | Date |
|---|---|---|
| 2,344,217 | Reason et al. | Mar. 14, 1944 |
| 2,352,219 | Olesen | June 27, 1944 |
| 2,408,711 | Volz | Oct. 1, 1946 |